May 28, 1968  E. B. MYERS  3,385,319
UNITARY MULTIPORT VALVE
Filed June 22, 1965  2 Sheets-Sheet 1
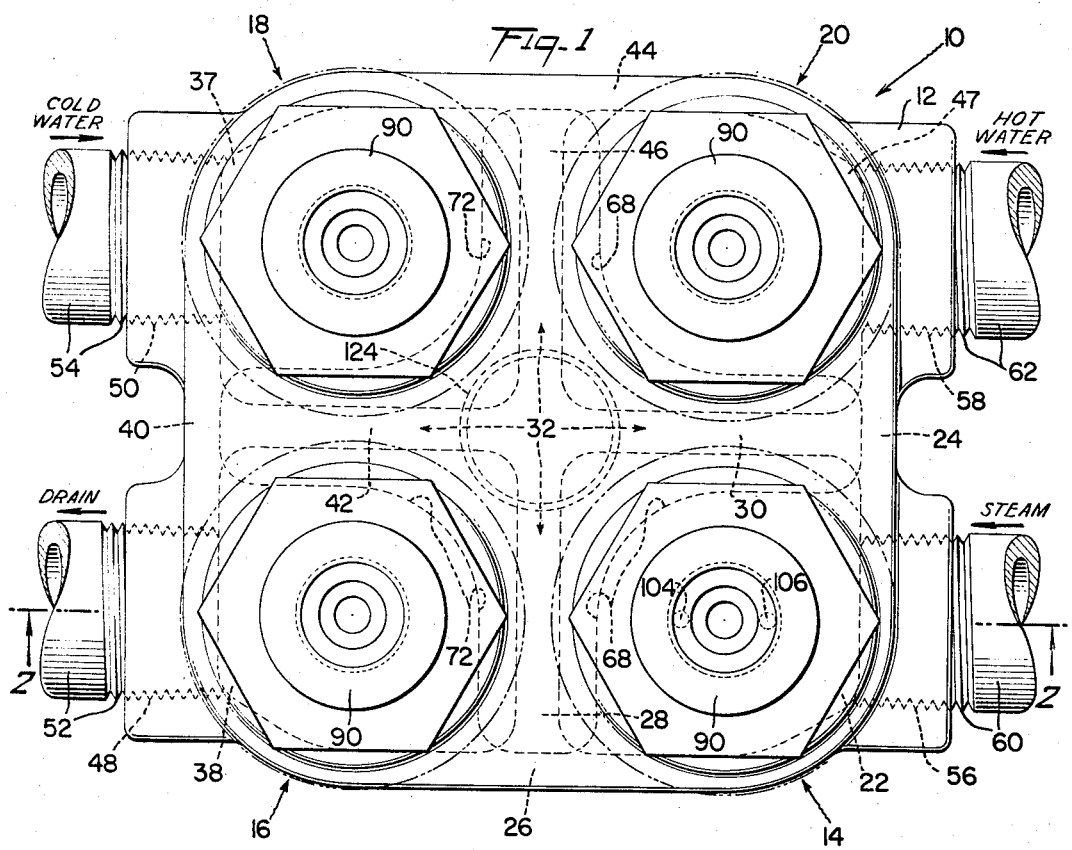
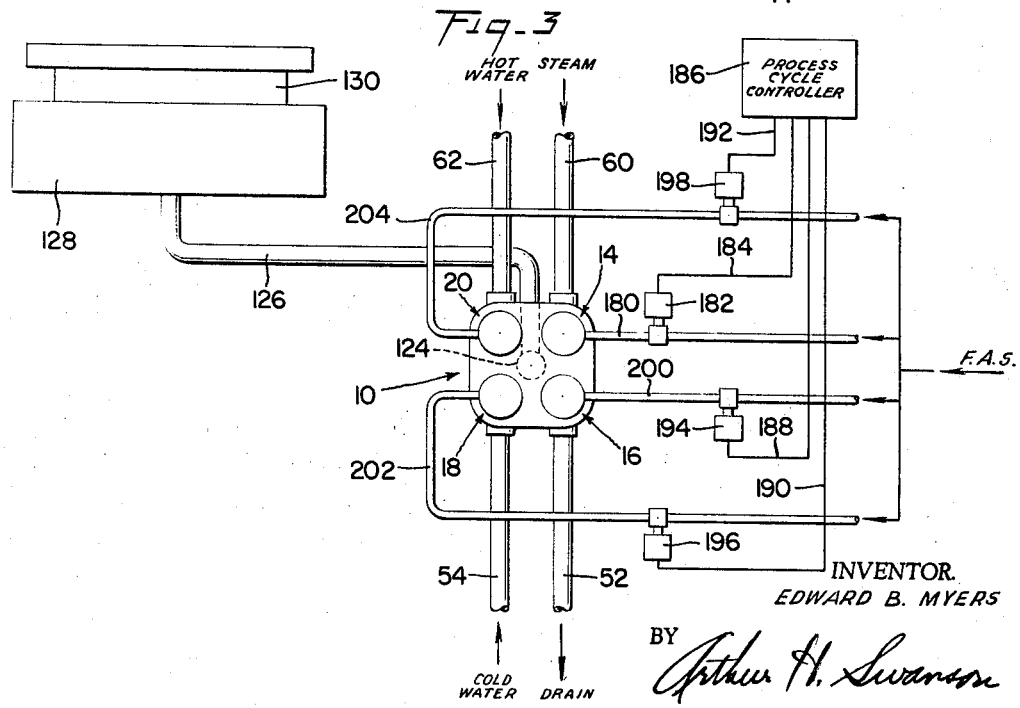
INVENTOR.
EDWARD B. MYERS
BY
*Arthur H. Swanson*
ATTORNEY May 28, 1968  E. B. MYERS  3,385,319
UNITARY MULTIPORT VALVE
Filed June 22, 1965  2 Sheets-Sheet 2

INVENTOR.
EDWARD B. MYERS
BY Arthur H. Swenson
ATTORNEY

United States Patent Office 3,385,319
Patented May 28, 1968

3,385,319
UNITARY MULTIPORT VALVE
Edward B. Myers, Oreland, Pa., assignor to Honeywell
Inc., Minneapolis, Minn., a corporation of Delaware
Filed June 22, 1965, Ser. No. 465,866
10 Claims. (Cl. 137—596.18)

ABSTRACT OF THE DISCLOSURE

A unitary, compact, leak-proof, multiport valve having a common apertured plate forming a passageway between each one of a plurality of separate chambers and a common chamber, valves unaffected by changes in the coefficient of the valve parts are employed to selectively control the direct flow of fluids e.g. steam, cold water, hot water or other fluids through the passageways to the common chamber and to a utilitarian means such as a rubber curing press and to control the reverse flow of these fluids from the utilization means by way of the common chamber into another separate chamber to a drain.

---

It is an object of the present invention to disclose a unitary, compact, multiport, fluid-pressure actuated valve.

More specifically, the general object of the present invention is to disclose a valve of the aforementioned type which is comprised of direct-acting and/or reverse-acting, diaphragm-actuated cage valves and inlet ports associated therewith in the body of the valve that will selectively restrict or permit a fluid to flow from any one of these inlet ports into a common chamber in the body of the valve and thence to a utilization means.

It is another object to disclose cage valves whose bonnet, cage and plug can rapidly be removed, serviced and replaced without removing their common valve body from a process flow line of which the body forms an integral part.

It is an object of the present invention to disclose a multiport valve that will sequentially transmit different independent streams of fluid that flow from its inlet ports into either the aforementioned common chamber and the utilization means connected therewith or to a common drain line.

More specifically, it is the object of the present invention to disclose a multiport valve whose respective inlet ports are sequentially opened to transmit a stream of cold water, hot water or steam under pressure by way of a common chamber in the valve body to the utilization means or to the drain line.

It is still another object of the present invention to disclose a multiport valve that can be used to sequentially introduce hot water, steam and cold water into a chamber surrounding a mold that is employed in a rubber, plastic or other curing process and to drain these fluids from the chamber about the mold in a prescribed sequence.

It is another, still more specific, object of the invention to employ the aforementioned multiport valve to control the sequential flow of these pressurized fluids from the common chamber of the valve to, for example, platens that are comprised of high pressure steam chambers and to a curing bladder located respectively inside and outside the mold of a forming press that is used to cure green tires.

One of the problems that has heretofore been encountered when other types of valves, for example dual body steam valves, have been used to control the flow of fluids to chambers surrounding a rubber or plastic curing mold is that leakage of fluid occurs at a gasket that is held in place between the two body parts. This leakage is caused by the fact that a different coefficient of expansion takes place between the two body parts and tie bolts that hold these parts together. This difference in expansion causes the two body parts to separate and a leak to occur.

It is another object of the invention to disclose a multiport valve of the aforementioned type whose fixed, sealed parts are unaffected by ambient temperature changes and which does not require the use of tie bolts.

It has heretofore been the practice to employ a single, unitary valve in the steam feed conduit, a second different unitary valve spaced at a distance from the first valve in a hot water feed conduit, a third different unitary valve that is spaced at a distance from the first and second valves in a cold water feed conduit and a fourth unitary valve that is spaced at a distance from the other three valves that are associated with one of these valves and a drain conduit.

It is a final object of the invention to disclose a construction which will combine all of the aforementioned valves into a unitary, compact, four-port valve and thereby considerably reduce the number of fluid conduits and valve parts that have heretofore been required when separate valve and separate feed lines associated with this valve have been used.

A better understanding of the present invention may be had from the following detailed description when read in connection with the accompanying drawings, in which:

FIGURE 1 is a top plan view of the multiport valve showing the valve bonnet and housing in solid-line form and the actuator portion in phantom-line form;

FIGURE 3 is a view showing how the multiport valve disclosed herein is used to sequentially control the flow of the supply of cold water, hot water and steam under pressure to a plastic or rubber curing mold and further shows how these streams can be drained from the mold by way of a drain line at the body of the valve.

Figure 2:
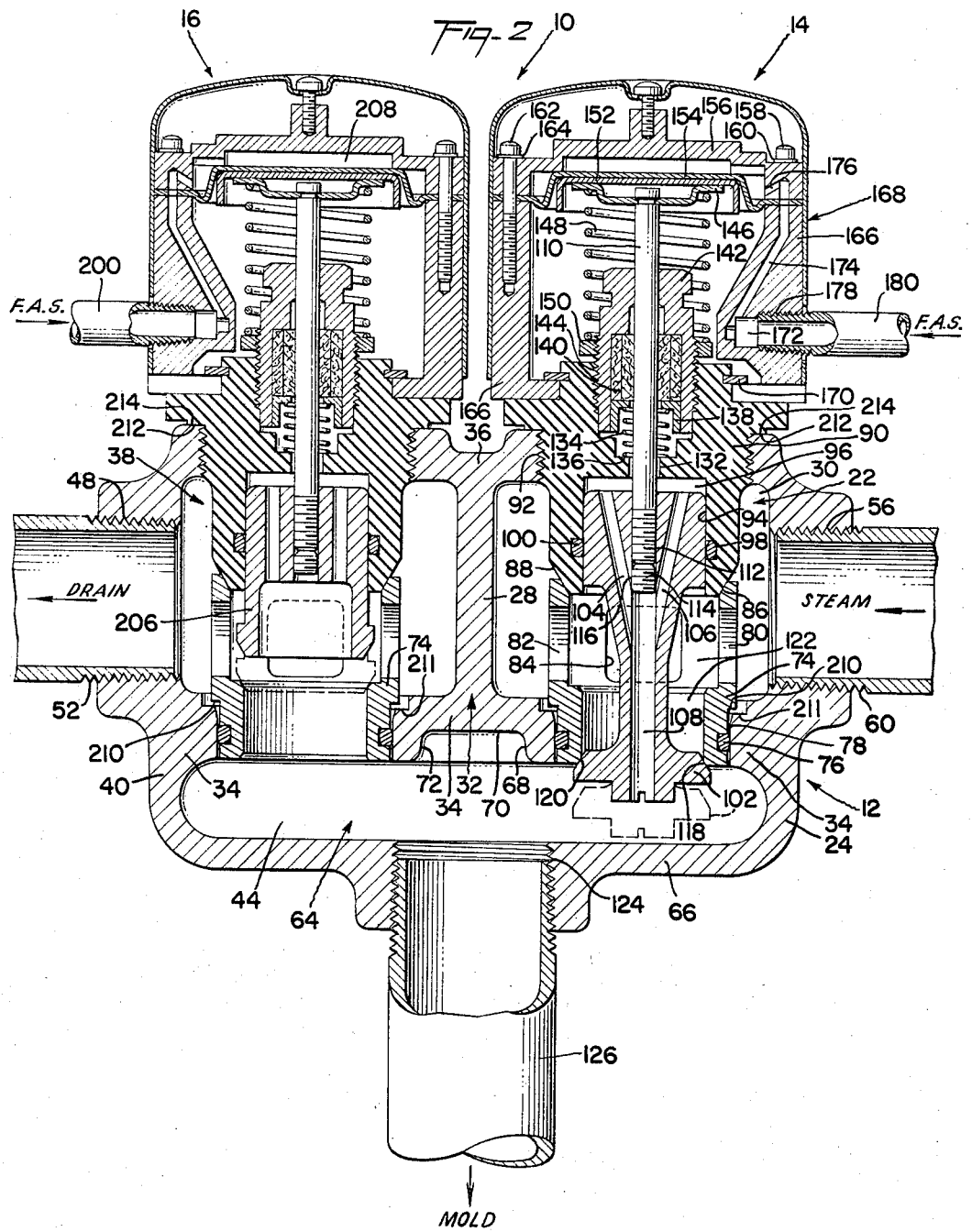
FIGURE 2 is a typical cross-sectional view of the valve and its connections taken along the line 2—2 of FIGURES 1.

FIGURES 1 and 2 show the aforementioned manifold valve unit 10 as being comprised of a housing or body 12 and four fluid actuated cage valves 14, 16, 18 and 20.

The body 12 is preferably made of cast bronze or ductile iron. The body 12 contains a first chamber 22 that is formed of an embossed side wall 24, a front wall 26, the portions 28, 30 of a cross-shaped rib 32, a lower wall portion 34 and an upper wall portion 36.

The aforementioned cast body 12 also contains a second chamber 38 that is formed of an embossed side wall 40, a front wall 26, the portions 28, 42 of the cross-shaped rib 32, a lower wall portion 34 and an upper wall portion 36.

A third chamber 37 that is similar to the second chamber 38 is formed by the body 12 that contains an embossed side wall 40, a rear wall 44, the portions 42, 46 of the cross-shaped rib 32, a lower wall portion 34 and an upper wall portion 36.

A fourth chamber 47 is formed by the body 12 that contains an embossed side wall 24, a rear wall 44, the portions 46, 30 of the cross-shaped rib 32, a lower wall portion 34 and an upper wall portion 36.

The embossed left side wall of the body 12 contains threaded, bored-out passageways 48, 50 therein to accommodate the threaded, fluid-tight connection of a drain conduit 52 and a cold water inlet conduit 54 therewith.

The embossed right side wall of the cast body 12 contains threaded, bored-out passageways 56, 58 therein to accommodate the threaded, fluid-tight connection of a steam inlet conduit 60 and a hot water inlet conduit 62 therein.

As is best shown in FIGURE 2, the lower portion of the body 12 contains a common chamber 64 formed by the wall portion 34, the side walls 24, 40, the front and rear walls 26, 44, and a wall 66 forming the base of the body 12.

The wall portion 34 is cored-out along its surface portion 68, 70, 72 to reduce the weight of this portion of the cast body 12.

The fluid-actuated, reverse-acting cage valve 14 is comprised of a seat 74 that is of a cage-shaped configuration and preferably made of stainless steel. The lower end of the seat 74 is shown retained by means of a resilient O-shaped ring 76 associated therewith in fluid-tight engagement with a wall 78 that forms an aperture in the wall portion 34.

The upper end of the seat 74 is shown containing a suitable number of spaced-apart ports such as the ports 80, 82, 84 (shown in FIGURE 2). The inside surface 86 of the upper end of the seat 74 is beveled and is shown in physical surface-to-surface contact with a beveled edge 88 of a bonnet 90 that is preferably made of bronze. The upper wall portion 36 contains a threaded, bored-out passageway 92 therein to accommodate the threaded, fluid-tight connection of the bonnet 90 therewith.

The inner portion of the bonnet 90 has a surface 94 that forms a cylindrical chamber 96 therein. A slot 98 is formed on the surface 94 to accommodate the insertion of a resilient, O-shaped ring 100 therein.

A plug 102 that is preferably made of stainless steel is positioned within the chamber 96 for slidable movement with respect to its surface 94. The plug has two angularly positioned passageways 104, 106 therein that open into a third passageway 108 to allow the free flow of fluid between the common chamber 64 and the part of the chamber 96 that is immediately above the plug 102. The top and bottom areas of the plug 102 are purposely made equal in order to provide a plug that will be balanced under an opened, closed or partially opened plug condition. A stem 110 is shown threadedly connected at 112 to the plug 102 and a set screw 114 is shown threadedly mounted at 116 in the plug 102 and having its upper end in tight compressed engagement with the lower end of the stem 112 to prevent stem and plug rotation.

The lower end of the plug 102 can be moved by the up and down movement of stem 110 between its solid-line valve closed position and its dotted-line valve open position. When the plug 102 is in its solid-line position, its beveled edge 118 is brought into fluid sealed contact with the beveled edge 120 of the cage 102 and no steam under pressure can flow into the common chamber 64 from the steam-carrying conduit 60 and the internal chamber 122 in which the steam is stored.

When the plug 102 is in its dotted-line open position, its beveled edge 118 will be moved downwardly out of engagement with the beveled edge 120 of the cage 102 and steam under pressure can flow into the common chamber 64 from the steam carrying conduit 60 and the internal chamber 122. The steam then passes by way of the threaded, bored-out passageway 124 and its associated conduit 126 to a chamber 128 surrounding a mold 130 used in the previously-referred-to rubber, plastic or other curing process.

The upper end of the stem 110 is shown passing through and in spaced relation with a centrally located, bored-out wall portion 132 formed in the upper end of the bonnet 90. The stem 110 is also shown passing through a coiled spring 134 that is fixed against an inner wall 136 of the bonnet 90 at its lower end and which is positioned to apply a force by way of a cup-shaped follower 138 to a lower end of the V-shaped packing 140.

The stem 110 also passes through central apertures formed by the cup-shaped follower 138 and packing 140 as well as passing through the packing plug 142 that is in threaded engagement at 144 with the top contact portion of the bonnet 90.

The stem 110 is fixedly connected at its upper end to the central portion of the cup-shaped plate 146. The lower surface of the plate 146 is contacted by the upper end of a spring 148 that, in turn, has a nut 150 that is adjustably mounted on the threaded portion 144 of the bonnet to thereby alter the magnitude of spring force that the spring 148 can apply to this plate 146.

The upper surface of the plate 146 is in engagement with a diaphragm plate 152 that, in turn, contacts a sectional diaphragm 154. The diaphragm 154, in turn, is retained in place by means of an inverted cup-shaped plate 156 and a suitable number of spaced-apart securing screw and lock washer units 158, 160; 162, 164 that threadedly retain the diaphragm 154 and plate 156 in contact with a stationary part 166 of the actuator portion 168 of the valve 14. The stationary part 166, in turn, is shown retained in a fixed position on the bonnet 90 by means of a retaining snap ring 170.

The stationary part 166 contains interconnected passageways 172, 174, 176. Passageway 172 is shown threadedly interconnected at 178 by way of a conduit 180 to a filtered pressurized air supply source identified as F.A.S. in FIGURES 2 and 3. A valve 182, which preferably is a three-way solenoid valve, is shown mounted in the supply conduit 180 to perform the function of simultaneously cutting off the supply of pressurized F.A.S. air from being supplied to the chamber formed by the inverted cup-shaped plate 156 and the diaphragm 152 and exhausting the air under pressure that was previously introduced into the conduit 180 and passageways 172-176 and the last-mentioned chamber to atmospheric pressure.

As this latter-mentioned air exhausting action takes place, the spring 148 will be allowed to expand and apply its spring force to move the stem 174 and plug 102 in an upward direction to the closed valve, solid-line position shown for these parts in FIGURE 2.

FIGURE 3 shows in schematic form the three-way solenoid valve 182 connected by means of the electrical connection 184 to a commercially-available process cycle controller 186. The process cycle controller 186 has additional electrical connections 188, 190, 192 to perform similar valve closing and valve opening operations as that which has just been described for the three-way solenoid valves 194, 196 and 198 that are mounted in the pressurized filtered air supply conduits 200, 202, 204.

The other ends of the conduits 200, 202, 204 are connected to the fluid pressure actuating chambers of their associated cage valves 18, 20 in the same manner as that shown for the conduit 180 and passageways 172, 174, 176 shown for the reverse-acting cage valve 14 in FIGURE 2.

FIGURE 2 shows that the only part employed by the reverse-acting valve 14 that is different from the direct-acting valve 16 lies in the different construction which each of these valves employs for its respective plugs 102, 206. When the three-way solenoid valve 194 is opened by the action of the process controller 186 in a prescribed sequence with the valve 182, the pressurized air from the F.A.S. will be supplied to chamber 208 and the plug 206 will be moved from its solid-line open position to its dotted-line closed position.

It can also be seen that the reverse-acting type of plug 102 can be used by any one of the valves 14–20 when it is desired to have the pressurized F.A.S. that is being supplied to the valve open the valve. It can further be seen that any one of the valves 14–20 can employ a direct-acting plug 206 in place of reverse-acting plug 102 when it is desired to have the pressurized F.A.S. that is being applied to any one of these valves close that valve. Space is purposely provided between the annular surface 210 of the cage 74 and the annular surface 211 of the housing 12 in order to maintain a fluid sealing contact between the annular surface 214 of the housing 12 and the annular surface 216 of the bonnet 90 under all temperature conditions of the fluids passing through the housing 12. This construction thus provides a multiport valve whose fixed sealed parts are unaffected by ambient temperature changes.

The multiport valve 10 can thus be combined with the aforementioned process cycle control 186 and the solenoid valve 182, 192, 194, 196 in the pressurized, filtered air lines 180, 200–204 to control the flow of steam, hot water and cold water being supplied and being drained from the chamber 128 surrounding the rubber curing press 128 in the following sequence:

| Steam Valve 14 | Hot Water Valve 20 | Cold Water Valve 18 | Drain Valve 16 |
|---|---|---|---|
| Open to Mold | Closed | Closed | Closed. |
| Closed | do | do | Open to Drain. |
| Do | do | do | Closed. |
| Do | Open to Mold | do | Do. |
| Do | Closed | do | Open to Drain. |
| Do | do | do | Closed. |
| Do | do | Open to Mold | Do. |
| Do | do | Closed | Open to Drain. |

It should be understood that the process cycle controller can be conditioned to provide certain preselected sequences in which the valves 14–20 of the multiport valve 10 are opened and closed when the valve is used to control the flow of steam, cold water, hot water or other fluids to and from other utilitarian means than the previously-mentioned rubber curing press.

The unitary, compact, leak-proof, multiport valve 10 thus discloses, for the first time, a valve having a common chamber and a plurality of separate interrelated valve chambers associated with the common chamber into each of which a cage valve can be inserted that, in turn, is provided with interchangeable plugs to convert it from a direct-acting to a reverse-acting balanced valve and vice versa.

What is claimed is:

1. A unitary, multiport valve, comprising a valve body, divided into five compartments, each one of three of the compartments having a separate inlet port adapted to receive a different one of three streams of fluid under pressure, the remaining fourth and fifth chambers each having a separate outlet port, a common wall positioned to separate each the first four chambers from the fifth chamber, separate passageways extending through the common wall positioned between each of the first four chambers and the fifth chamber, a valve operably positioned within each of the first four chambers, the first three valves being operably positioned to open in a preselected sequence while the valve in the fourth chamber remains closed to thereby allow a fluid stream being introduced through the port of each open valve in its associated compartment to pass through the passageway into the fifth chamber and to the outlet port in the fifth chamber adapted to be connected to a utilization means, and the multiport valve being further operably positioned to close the passageway in the first, second and third compartments and open the passageway in the fourth compartment to thereby prevent the fluid stream introduced into each of the first three compartments through their associated inlet ports from being applied by way of the fifth chamber to its outlet port when the fluid that has been introduced through any one of the first three valved passageways into the fifth chamber is drained from the outlet port through the open passageway in the fourth chamber.

2. A unitary valve comprising a multi-compartmental body, a common wall separating a single common one of the compartments from the remaining compartments, passageways extending through the wall to form direct open connections between the single common compartment and each of the remaining compartments, one of said remaining compartments having a drain outlet associated therewith, the other remaining compartments each having a separate inlet to accommodate the passage of separate streams of pressurized fluid thereto, the single common compartment having an outlet port that is adapted to be connected to a utilization means, separate valves operably positioned to cooperate with the passageway in the common wall to simultaneously close the compartment containing the drain outlet and to open a selected number of each of the other remaining passageways in said common wall to thereby effect the flow of different streams of the pressurized fluid by way of the compartments to the outlet port and the separate valves being further operable to cooperate with the passageways in the common wall to simultaneously close the selected valves and to simultaneously open the valve associated with the passageway in the common wall that opens into the compartment containing the drain to thereby drain the pressurized fluid from said outlet port and the single common one of the compartments.

3. The multiport valve defined in claim 2, wherein each of the valves comprises a body portion, a bonnet having a wall forming an internal chamber thereof and having a surface that is in fluid-tight engagement with a surface of the body portion, a cage positioned within the body portion and in contact with the bonnet, a plug slidably mounted for movement along the internal wall of the bonnet toward, into engagement and away from a seat formed on the internal surface of the cage, a seal mounted on the cage to provide a part on which the cage can oscillate and slide in the body portion and thereby maintain the fluid-tight engaging surfaces of the bonnet and body portion in sealed contact before, during and after the occurrence of a change in coefficient of expansion of the bonnet and body portion.

4. A unitary, multiport valve comprising a unitary housing separated into a first compartment, a second compartment and a third compartment, means at each of the three compartments for connection to a source of pressurized fluid, a chamber adjacent the three compartments having a first wall that forms a common partition therebetween, separate passageways in the first wall extending between each of the three compartments and the common chamber, a separate cage valve having a plug operably connected for movement in each of the compartments from an enclosed position to an open position with respect to the passageways associated with each compartment, a fourth compartment, a passageway forming a drain in the fourth compartment, another portion of said first wall forming a common partition between the fourth compartment and the common chamber, another passageway in the first wall extending between the fourth compartment and the common chamber, a fourth cage valve having a plug operably connected for movement in the fourth compartment to a sealed-off position wherein the portion of the first wall forming the last-mentioned passageway is closed when any one of the first three mentioned valves is open to thereby apply the fluids in the first three compartments by way of the common chamber to a port in the last mentioned chamber and the fourth cage valve being operable to be moved to an open position when the first three valves are closed to drain the fluid from the port and the common chamber through the drain in the fourth compartment.

5. The multiport valve as defined in claim 4, wherein each of the valves is comprised of a bonnet having a surface thereof mounted in fluid-tight engagement with a surface of the housing, a cage in contact with the housing and bonnet, the cage having an annular groove in its outer periphery, a resilient annular member mounted in the groove and having an outer annular portion extending beyond the wall of said cage, said resilient member being positioned at a location along the cage to provide the sole means by which the cage can oscillate and slide in the housing and thereby maintain the said surfaces between the bonnet and housing in fluid-tight contact during a change in the coefficient of expansion occurring in the bonnet and housing.

6. The unitary, multiport valve as defined in claim 4, wherein each cage valve is comprised of a cage that has a seat and which is mounted at one end in fluid-tight engagement with the passageway in the first wall, a bonnet threadedly mounted in the housing for movement toward and into contact with the other end of the cage and into an assembled position when rotated in one direction and adapted to move away from another end of the cage to a disassembly position when rotated in an opposite direction.

7. The unitary, multiport valve as defined in claim 4, wherein each cage valve is comprised of a cage that has a seat and which is mounted at one end in fluid-tight engagement with the passageway in the first wall, a bonnet threadedly mounted in the housing for movement toward and into contact with the other end of the cage and into an assembled position when rotated in one direction and adapted to move away from another end of the cage to a disassembly position when rotated in an opposite direction and wherein said bonnet has an inner surface for guiding an outer surface of the plug as it is moved between its closed and open positions.

8. The unitary, multiport valve as defined in claim 4, wherein each of the cage valves is comprised of a cage that has two spaced-apart seats at one end and which is mounted at this latter-mentioned end in fluid tight engagement with the passageway in the first wall, a bonnet threadedly mounted for movement toward and into contact with the other end of the cage and into an assembled position when rotated in one direction and mounted for movement away from another end of the cage to a disassembled position when rotated in the opposite direction, said bonnet having an inner surface for guiding an outer surface of the plug as it is moved between its closed and open position, a first one of the two seats formed on the cage and the construction of the inner surface of the bonnet providing a means by which a direct-acting valve plug can be mounted in the bonnet for sliding movement toward, into engagement with and away from the first one of said seats and wherein the second one of the two seats formed on the cage and the construction of the inner surface of the bonnet provide a means by which a substitute reverse-acting valve plug can be mounted in the same bonnet for sliding engagement toward, into engagement with, away from the second one of the seats in an opposite manner to the direct-acting valve in the same cage when the valve is to be employed as a reverse-acting valve.

9. A valve, comprising a unitary body, a bonnet having a wall forming an internal chamber thereof and having a surface that is in fluid-tight engagement with a surface of the body, a cage positioned within the body and in contact with the bonnet, a seal mounted on the cage to provide a part on which the cage can oscillate and slide in the body and thereby maintain the engaging surfaces of the bonnet and body in fluid-tight contact before, during and after the occurrence of a change in coefficient of expansion of the bonnet and body and a plug slidably mounted for movement along the internal chamber wall of the bonnet toward, into engagement with and away from a seat formed on an internal surface of the cage.

10. A valve, comprising a unitary body, a bonnet having a wall forming an internal chamber thereof and having a surface that is in fluid-tight engagement with a surface of the body, a cage positioned within the body and in contact with the bonnet, a resilient means mounted on the cage to provide a seal on which the cage can move in the body and thereby maintain the engaging surfaces of the bonnet and body in fluid-tight contact before, during and after the occurrence of a change in expansion and contraction of the bonnet and body and a plug slidably mounted for movement along the internal chamber wall of the bonnet toward, into engagement with and away from a seat formed on an internal surface of the cage.

References Cited

UNITED STATES PATENTS

| | | | |
|---|---|---|---|
| 2,515,519 | 7/1950 | Lawrence et al. | 137—627 XR |
| 2,754,840 | 7/1956 | Hicks | 137—596.18 XR |
| 3,038,500 | 6/1962 | Lamsky et al | 137—596.16 XR |
| 3,128,788 | 4/1964 | Millard | 137—595 |

HENRY T. KLINKSIEK, *Primary Examiner.*